US010094681B2

(12) United States Patent
Andrew et al.

(10) Patent No.: US 10,094,681 B2
(45) Date of Patent: Oct. 9, 2018

(54) CONTROLLING A MAP SYSTEM TO DISPLAY OFF-SCREEN POINTS OF INTEREST

(71) Applicant: Microsoft Technology Licensing, LLC, Redmond, WA (US)

(72) Inventors: Felix Gerard Torquil Ifor Andrew, Seattle, WA (US); Chad S. Estes, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 15/248,934

(22) Filed: Aug. 26, 2016

(65) Prior Publication Data

US 2018/0058877 A1 Mar. 1, 2018

(51) Int. Cl.
*G06T 11/20* (2006.01)
*G01C 21/36* (2006.01)
*G06T 11/00* (2006.01)

(52) U.S. Cl.
CPC .......... *G01C 21/3682* (2013.01); *G06T 11/00* (2013.01); *G06T 2210/21* (2013.01)

(58) Field of Classification Search
CPC .................... G01C 21/367; G01C 21/3682
USPC ........................................................ 345/440
See application file for complete search history.

(56) References Cited

U.S. PATENT DOCUMENTS

| 8,589,818 | B1 | 11/2013 | Jones et al. |
| 8,635,021 | B2 | 1/2014 | Hong et al. |
| 2009/0169060 | A1* | 7/2009 | Faenger ............... G09B 29/007 382/113 |
| 2013/0162626 | A1 | 6/2013 | Gabara |

OTHER PUBLICATIONS

Baudisch, et al., "Halo: a Technique for Visualizing Off-Screen Locations", In Proceedings of the SIGCHI Conference on Human Factors in Computing Systems, vol. 5, Issue 1, Apr. 5, 2003, pp. 481-488.
Burigat, et al., "Visualizing References to Off-Screen Content on Mobile Devices", In Journal of Interacting with Computers, vol. 23, Issue 2, Mar. 2011, pp. 1-14.
Muller, et al., "Sparkle: An Ambient Light Display for Dynamic Off-Screen Points of Interest", In Proceedings of the 8th Nordic Conference on Human-Computer Interaction: Fun, Fast, Foundational, Oct. 26, 2014, pp. 51-60.
McGookin, et al., "Eyes-Free Overviews for Mobile Map Applications", In Proceedings of the 11th International Conference on Human-Computer Interaction with Mobile Devices and Services, Sep. 15, 2009, 2 pages.

(Continued)

*Primary Examiner* — Ryan R Yang
(74) *Attorney, Agent, or Firm* — Christopher J. Volkmann; Kelly, Holt & Christenson, PLLC

(57) ABSTRACT

An off-screen point of interest, that has a corresponding off-screen display attribute, is identified. A distance of the identified off-screen point of interest is compared to a distance threshold. A display element, corresponding to the off-screen points of interest, is displayed on a border of a map display, based upon the comparison, and based upon a direction in which the off-screen point of interest is located, relative to a reference point on the map display.

9 Claims, 12 Drawing Sheets

(56) References Cited

OTHER PUBLICATIONS

Burigat, et al., "Visualizing Locations of Off-Screen Objects on Mobile Devices: A Comparative Evaluation of Three Approaches", In Proceedings of the 8th conference on Human-computer interaction with mobile devices and services, Sep. 12, 2006, pp. 239-246.
Irani, et al., "Improving selection of off-screen targets with hopping", In Proceedings of the SIGCHI Conference on Human Factors in Computing Systems, Apr. 22, 2006, pp. 299-308.
Chittaro, Luca, "Visualizing Information on Mobile Devices", In Proceedings of Computer, vol. 39. Issue 3, Mar. 2006, pp. 40-45.
Schinke, et al., "Visualization of Off-Screen Objects in Mobile Augmented Reality", In Proceedings of the 12th international conference on Human computer interaction with mobile devices and services, Sep. 7, 2010, 4 pages.
Sandor, et al., "Egocentric Space-Distorting Visualizations for Rapid Environment Exploration in Mobile Mixed Reality", In Proceedings of 8th IEEE International Symposium on Mixed and Augmented Reality, Oct. 19, 2009, pp. 211-212.
Partridge, et al., "A Comparison of Navigation Techniques across Different Types of Off-Screen Navigation Tasks", In Proceedings of 11th IFIP TC 13 International Conference on Human-Computer Interaction, Sep. 10, 2007, pp. 716-721.
Sterling Udell, "Beginning Google Maps Mashups with Mapplets, KML, and GeoRSS: From Novice to Professional", Nov. 21, 2008, p. 1, p. 300, Springer-Verlag New York, Inc., New York, NY.

* cited by examiner

CONTROLLING A MAP SYSTEM TO DISPLAY OFF-SCREEN POINTS OF INTEREST

BACKGROUND

Computing systems are currently in wide use. Some such computing systems include mapping systems. Mapping systems allow a user to perform mapping functionality, such as to provide a destination and receive directions, view a display of a map given a desired location, among other things.

The mapping systems can also operate on a user device, or they can include a client component of a remote mapping service, that interacts with the remote mapping service. Both the client component and the remote mapping service can be used to perform the mapping functions on the user device.

Some mapping systems also display points of interest to a user. The points of interest can be user-defined points of interest (such as a user's favorite grocery store, coffee shop, restaurant, gas station, etc.) or the points of interest can be defined in other ways (such as well-known landmarks, etc.). The points of interest can be personal points of interest (such as the user's home location, work location, etc.). They can also be variable (such as points of interest which are based upon a user's starting and ending points on a trip). They can be relatively rare points of interest (such as the location of a hotel that a user is currently staying at), or they can be points of interest that are spread out (such as points of interest that are displayed as search results in response to a user-entered search query).

In some such systems, the number of points of interest that could be shown to a given user may be relatively large. If all the points of interest were displayed on the particular map display being shown, this would swamp the control surface of the map display. Therefore, map systems often limit the number of points of interest shown to a specific number, per category, or based on other point of interest ranking criteria. The number of points of interest that are displayed may also depend on the particular display device being used, the zoom level of the map display, or on other criteria.

Currently, map systems do not display any type of display element associated with points of interest that are outside of the map display that is currently being displayed.

The discussion above is merely provided for general background information and is not intended to be used as an aid in determining the scope of the claimed subject matter.

SUMMARY

An off-screen point of interest, that has a corresponding off-screen display attribute, is identified. A distance of the identified off-screen point of interest is compared to a distance threshold. A display element, corresponding to the off-screen point of interest, is displayed on a border of a map display, based upon the comparison, and based upon a direction in which the off-screen point of interest is located, relative to a reference point on the map display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
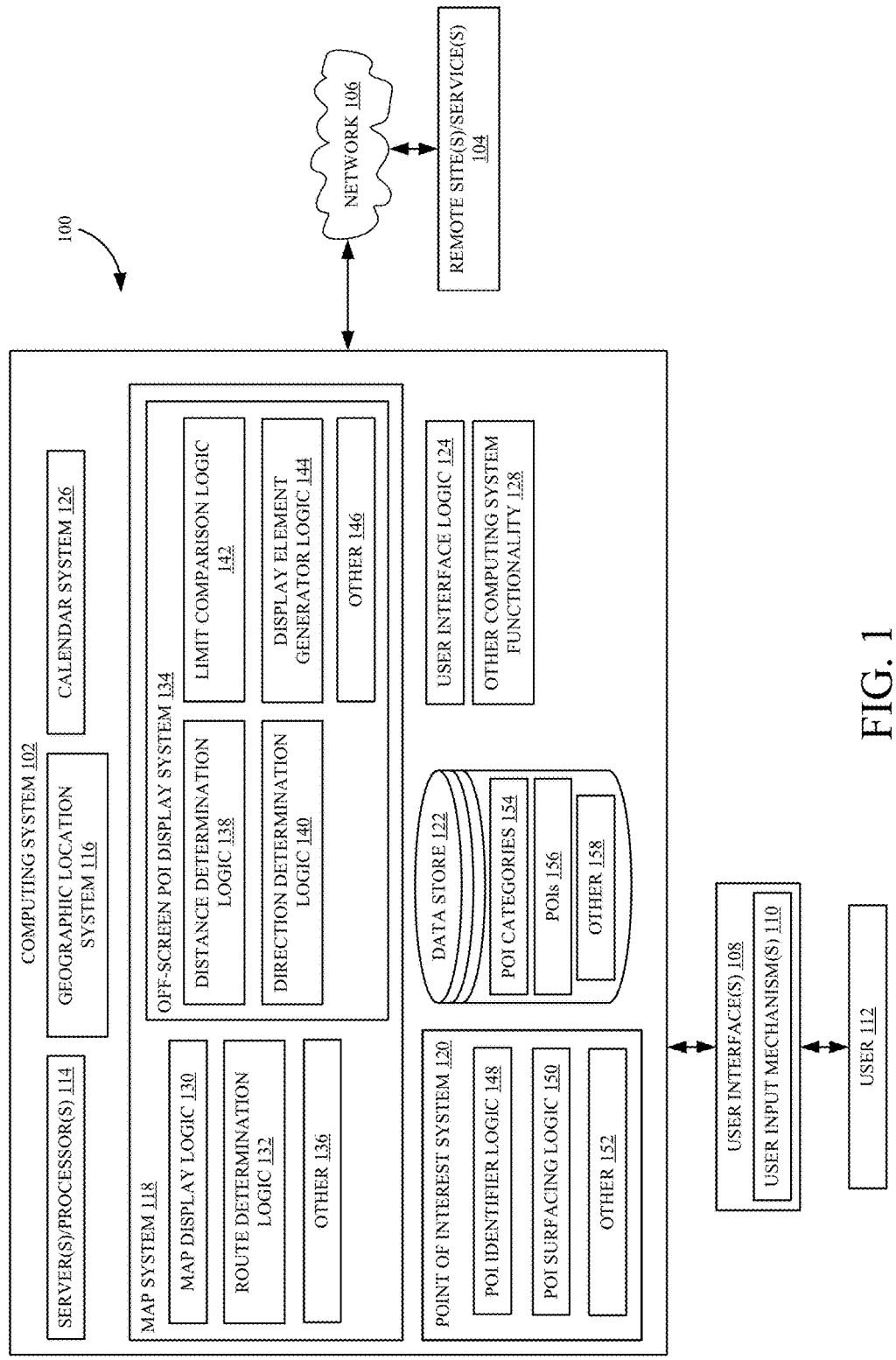
FIG. 1 is a block diagram of one example of a computing system architecture.

FIG. 1 is a block diagram of one example of a computing system architecture 100. Architecture 100 illustratively includes computing system 102 which can communicate with one or more remote sites or services 104 over network 106. Network 106 can be a wide variety of different networks, such as a wide area network, a local area network, a cellular network, a near field communication network, or other networks. FIG. 1 also shows that computing system 102 is illustratively generating user interfaces 108 with user input mechanisms 110 for interaction by user 112. User 112 illustratively interacts with the user input mechanisms 110 in order to control and manipulate computing system 102.

It will be noted that in some examples, parts or all of the functionality discussed below with respect to system 102 can be located and performed in a remote site or service 104 and sent to a client device running system 102. However, the present discussion proceeds with respect to it being performed in system 102, but this is for the sake of example only.

In the example shown in FIG. 1, computing system 102 illustratively includes one or more processors or servers 114, geographic location system 116, map system 118, point of interest (POI) system 120, data store 122, user interface logic 124, and it can include one or more of a wide variety of other systems, such as calendar system 126, etc. Computing system 102 can also include a wide variety of other computing system functionality 124. Map display system 118 can, itself, include map display logic 130, route determination logic 132, off-screen POI display system 134, and it can include a wide variety of other items 136. Off-screen POI display system 134 can, itself, include distance determination logic 138, direction determination logic 140, limit comparison logic 142, display element generator logic 144, and it can include other items 146. Point of interest system 120 can include POI identifier logic 148, POI surfacing logic 150, and it can include other items 152. Data store 122 can include point of interest categories 154, POIs 156, and a wide variety of other items 158.

Before describing the overall operation of architecture 100 in surfacing off-screen points of interest for user 112, a brief description of some of the items in architecture 100, and their operation, will first be provided. Some of these are also described in more detail below.

Geographic location system 116 illustratively identifies a geographic location of computing system 102. It can, for instance, be a GPS receiver or a wide variety of other geographic location systems.

Map system 118 illustratively allows user 112 to perform mapping functionality on computing system 102. For instance, it can allow the user to specify a location (such as the user's current location or a different location) and display a map surrounding that location. The user's current location can be obtained from geographic location system 116, or in other ways. Map system 118 can also allow a user to enter a starting point, and a destination. Route determination logic 132 can identify a best route between those two points. Map display logic 130 can then display a map display including route information indicative of the route. POI system 120 can surface points of interest based upon their distance from the location of system 102, or from a different location input by the user. It can also surface points of interest based upon their distance from the route that is determined by route determination logic 132. It can identify points of interest based upon a wide variety of other criteria as well.

POI identifier logic 148 illustratively identifies and ranks points of interest using the particular identifying and ranking criteria. In one example, it first identifies relevant POI categories 154 based upon those criteria, and then identifies particular POIs 156 in each of those categories. By way of example, assuming that the user's destination is a movie theater, it may be that points of interest in the restaurant category are more relevant than those in the landmark category. It may also be that, based upon the time of day, the user may wish to attend a restaurant after viewing a movie at the movie theater. Therefore, POI identifier logic 148 may identify particular restaurants that are close by the user's destination location as being particularly relevant. Again, this is by way of example only and identifying and ranking particular points of interest using logic 148 can be done in a wide variety of other ways as well.

It will be noted that, in one example, POI identifier logic 148 may identify points of interest that would appear on the particular map display that is currently being displayed by map display logic 130. It may also identify points of interest that would be off-display or off-screen points of interest as well. In the latter case, it may be that each of the POIs 156 in data store 122 has an attribute indicating whether it should be considered for display, even if it is off-screen (or off of the map display currently being displayed by map display logic 130). Once the POIs are identified by logic 148 (both the POIs that will be displayed on the map display, and those that are to be displayed even though they would be off of the map display), POI surfacing logic 150 surfaces those for map system 118.

In one example, the off-screen POIs that are surfaced by logic 150 are provided to off-screen POI display system 134, which determines whether those off-screen POIs are to be displayed, and if so, the location on the particular map display where they are to be rendered. For instance, distance determination logic 138 can determine the distance between an off-screen POI surfaced by logic 158 in POI system 120 to a reference point on (e.g., the center of) the map display that is currently being generated (or rendered) by map display logic 130. Direction determination logic 140 can determine a particular direction in which the off-screen POI is located, relative to the reference point on the current map display. Limit comparison logic 142 can determine whether it is close enough to the reference point on the current map display to be displayed using an off-screen POI display element, and if so, display element generator logic 144 generates an off-screen POI display element that will be rendered on the map display to represent the off-screen POI. The operation of off-screen POI display system 134 is described in greater detail below with respect to FIG. 3, and one example of a user interface displaying an off-screen POI is illustrated in FIG. 4 below.

It should also be noted that off-screen POI display system 134 can be separate from map system 118. It can also be located in POI system 120, or elsewhere. In such an example, it may expose an application programming interface (API) that can be called by either map system 118 or POI system 120, or both, to obtain an indication of which off-screen POIs are to be displayed, and how they are to be displayed (e.g., where they are to be located on the map display). System 134 is shown in map system 118 in FIG. 1, for the sake of example only.

It will also be noted that, in one example, map display logic 130 generates an indication of the map display that will be rendered, including the off-screen POI display elements that are generated by generator logic 144. Map display logic 130 can then, itself, or using user interface logic 124, render the display elements on a display device, and some examples of this are described below.

It will also be noted that the particular surfacing mechanism (or display element) can surface information for each point of interest, and it can take a wide variety of different forms. For instance, it can be a descriptive link that describes or names the particular point of interest, and that can be actuated by user 112. When user 112 actuates the link, the user may be navigated to additional information about the point of interest, or that information may be displayed on a pop-up or other display. This is only one example, and a wide variety of other surfacing mechanisms (or display elements) can be used as well.

It should also be noted that POI system 120 can access a wide variety of different information in determining which particular POIs are to be surfaced for user 112. For instance, system 120 can access the user's calendar system 126 to determine where the user will be in the near future. Calendar system 126 may indicate that the user has a hotel reservation for the current night at a particular hotel, located at a particular location. This information may be used to identify POIs around the hotel, for example. Similarly, POI system 120 can access a wide variety of other remote sites or services 104 to obtain information that may be relevant in determining which POIs (both on-screen and off-screen POIs) to surface for user 112 at any given time, and under any given circumstances.

Figure 2:
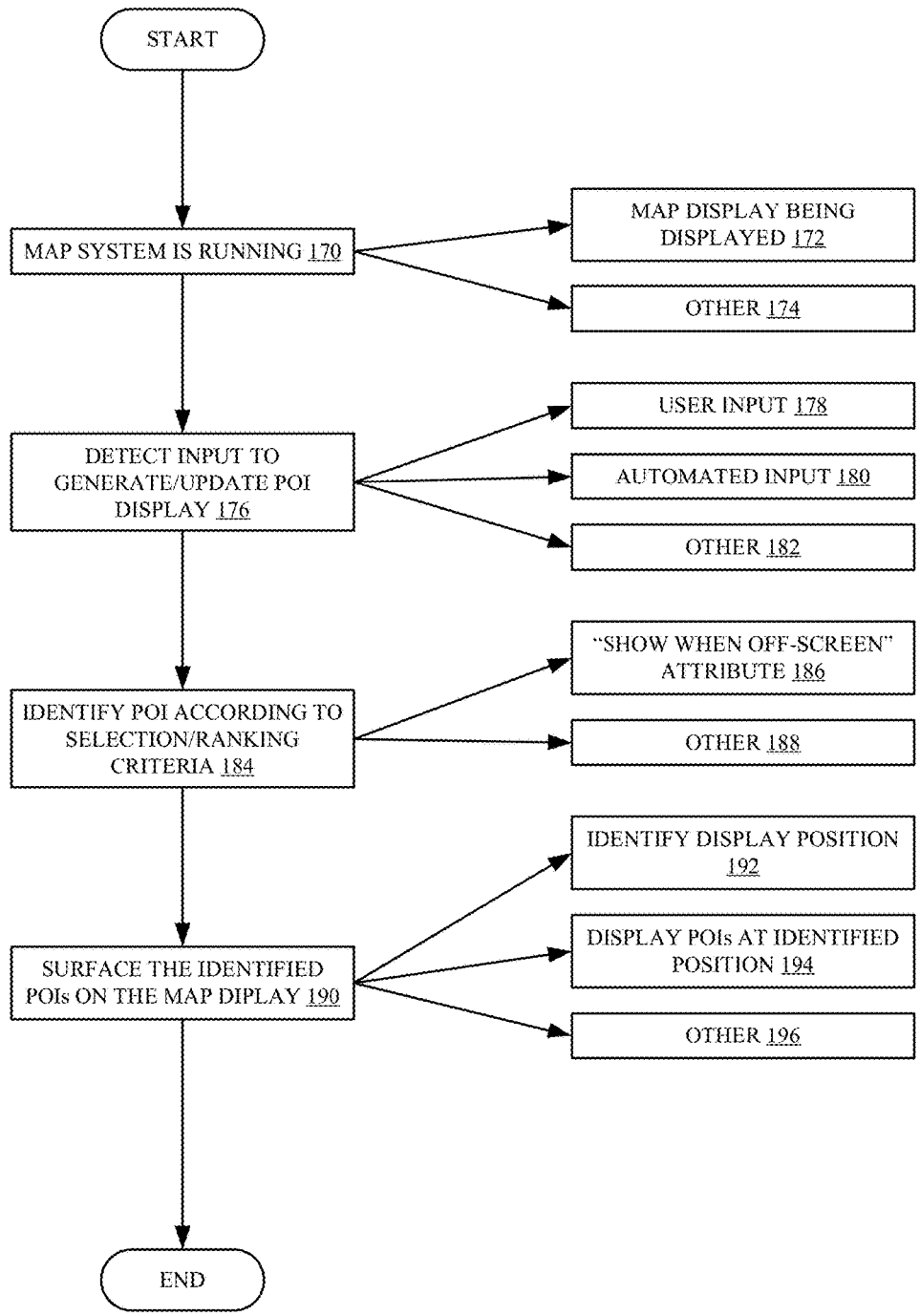
FIG. 2 is a flow diagram illustrating one example of the operation of the map system and point of interest (POI) system shown in FIG. 1, in surfacing points of interest on a map display.

FIG. 2 is a flow diagram illustrating one example of the operation of architecture 100, in surfacing POIs for user 112, in more detail. It is first assumed that user 112 has controlled map system 118 so that it is running on computing system 102. This is indicated by block 170 in FIG. 2. In one example, map display logic 130 is showing a map of some geographical location. This is indicated by block 172. Also, in one example, the map display has one or more display elements that indicate the user's route from a starting point to an ending point, or indicating the user's route on the map display being shown (e.g., if the zoom level is so high that the entire route is not shown, then only a portion may be shown). The map display may be running in other ways as well, such as by showing user input mechanisms that can be used by user 112 to control the map display or map system 118, among other things. This is indicated by block 174 in the flow diagram of FIG. 2.

Either map system 118, or POI system 120, then receives an input indicating that points of interest are to be displayed, or updated, on the map display. This is indicated by block 176 in FIG. 2. This may be, for instance, a user input 178, an automated input 180, or another type of input 182. By way of example, the user may actuate a point of interest mechanism that indicates to POI system 120 that the user wishes to have various different types of points of interest displayed on the map display. In another example, the user may change the zoom level of the map display and this may generate an automated input 180 to POI system 120 indicating that the displayed points of interest need to be refreshed or updated. For instance, if the user changes the zoom level to zoom out, it may be that more, fewer or different points of interest (e.g., both on-screen and off-screen points of interest) are displayed than if the user controls the display to zoom in.

A set of point of interest selection and ranking criteria may then be accessed. In one example, they are detected by map system 118 and/or other items in computing system 102 and provided to POI system 120. In another example, they can be detected by POI system 120 instead, or in addition. They can be retrieved from storage, directly detected or they can be calculated based on a variety of sensor inputs from various sensors. POI identifier logic 148 in POI system 120 then identifies points of interest according to the selection and ranking criteria. This is indicated by block 184 in the flow diagram of FIG. 2. The points of interest can be identified as those that will show up on the particular map display being displayed. They can also include off-screen points of interest where those points of interest include an attribute (e.g., when a "show when off-screen" attribute is set on the POI in the store 122) or other indicator which indicates that they should be considered by POI identifier logic 148, even though they are off-screen. A point of interest that has a "show when off-screen" attribute set is indicated by block 186. Identifying the POIs according to the selection and ranking criteria can be done in other ways as well, and this is indicated by block 188.

Point of interest surfacing logic 150 then surfaces the identified points of interest to map system 118 where they can be displayed by map display logic 130. This is indicated by block 190 in FIG. 2. Map display logic 130 may, for instance, identify a particular location on the map display where the POI display elements are to be displayed. It can then render them itself, or use user interface logic 124 to render the map display with the POIs displayed on it. Identifying the display position on the user interface is indicated by block 192, and displaying the POIs at the identified position on the map display is indicated by block 194. The identified POIs can be surfaced in other ways as well, and this is indicated by block 196.

In addition, the off-screen POIs that are identified and surfaced by system 120 can be provided to off-screen POI display system 134. System 134 can then use distance determination logic 138 to determine how far the off-screen POIs are located from a reference point (e.g., the center) of the map display, and it can use direction determination logic 140 to identify the direction in which they are located from the reference point on the map display. Limit comparison logic 142 and display element generator logic 144 can then determine which of the off-screen POIs are to be displayed along the border of the map display, and can generate a display element indicative of those off-screen POIs, respectively. This is described in greater detail below with respect to FIGS. 3 and 4.

Figure 3:
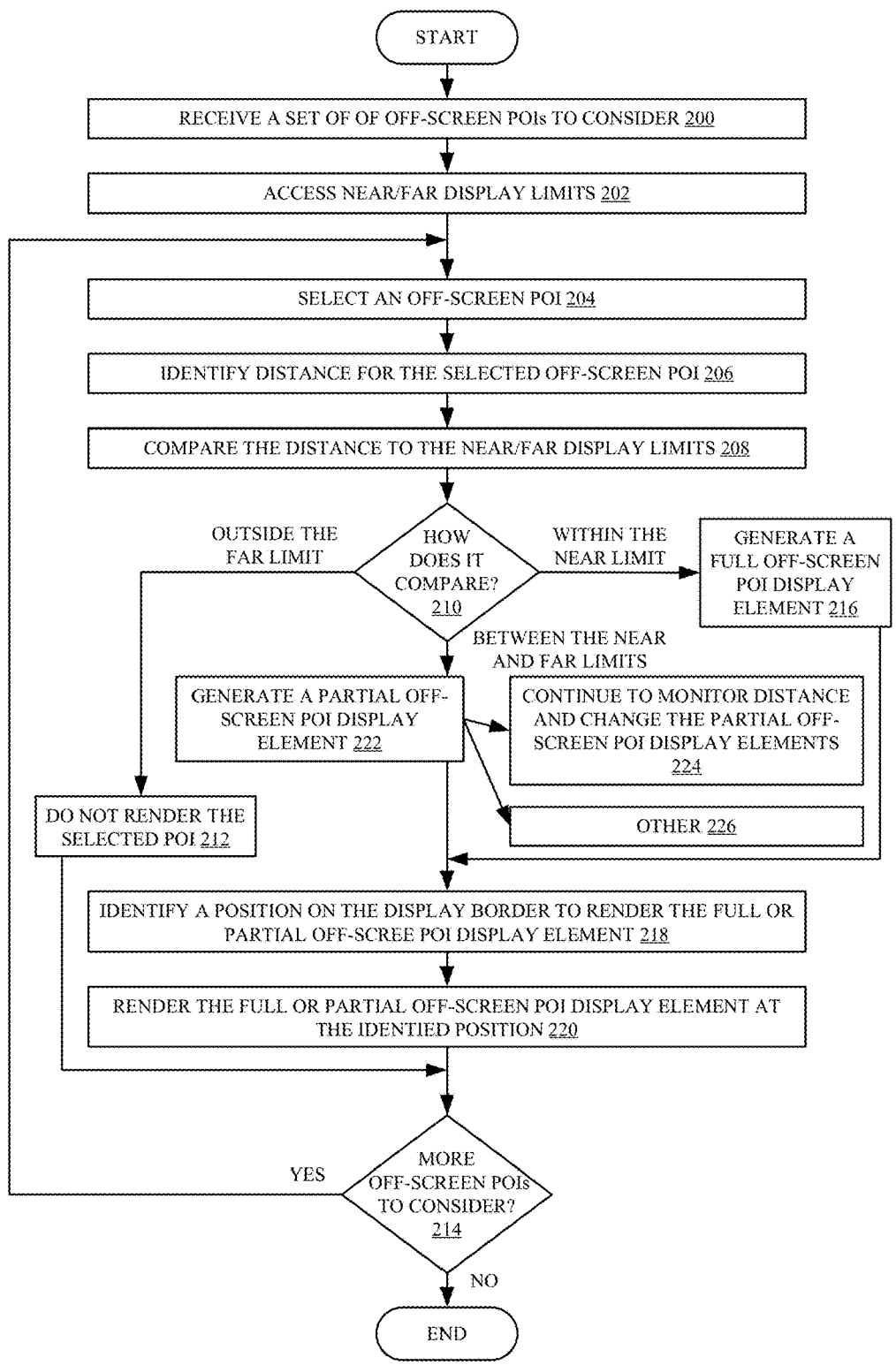
FIG. 3 is a flow diagram illustrating one example of the operation of off-screen POI display system (shown in FIG. 1) in more detail.
Figure 4:
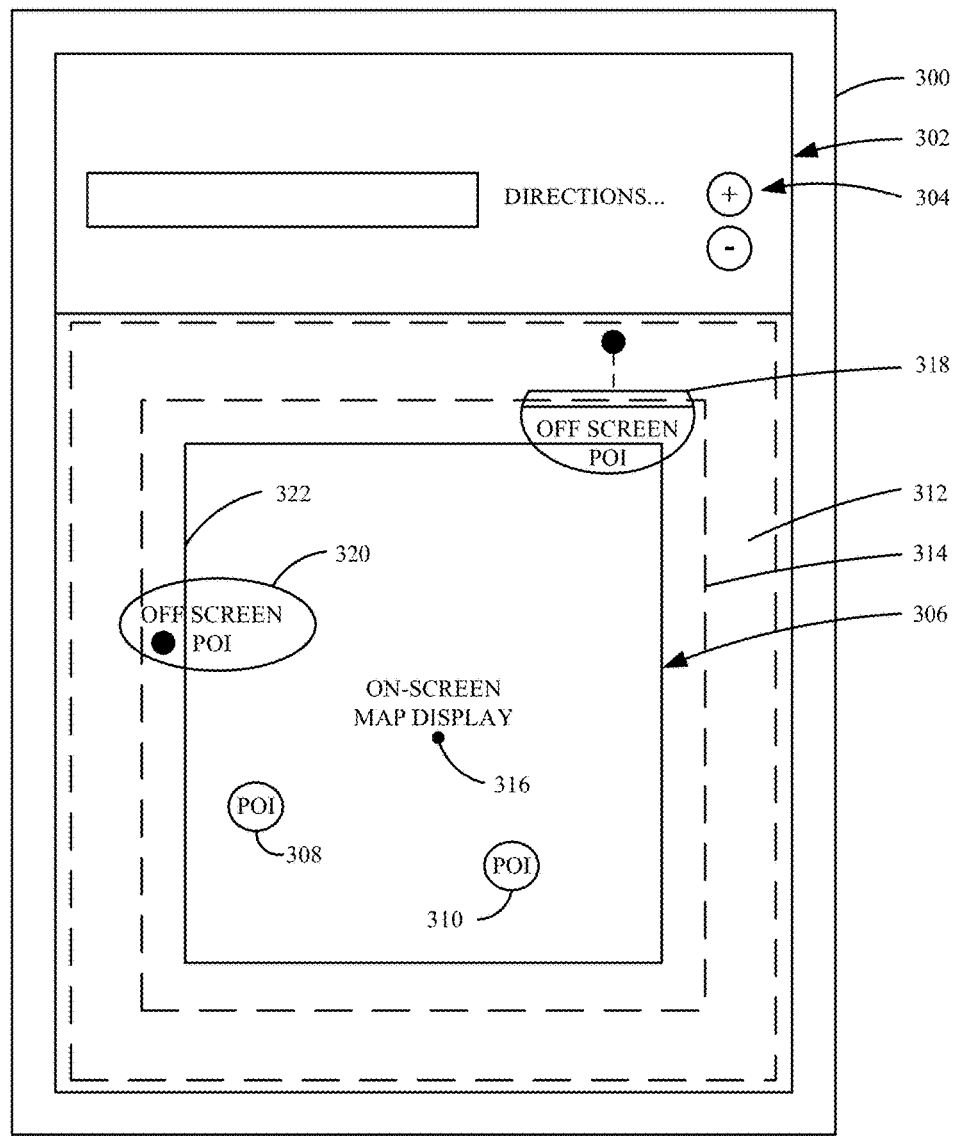
FIG. 4 is one example of a user interface display.

FIG. 3 is a flow diagram illustrating one example of the operation of off-screen POI display system 134, in more detail.

Off-screen POI display system 134 first receives a set of off-screen POIs to consider. This is indicated by block 200 in the flow diagram of FIG. 3. For instance, it can receive off-screen POIs that are surfaced by POI surfacing logic 150 in POI system 120. It can receive the set of off-screen POIs in other ways as well.

System 134 also accesses a set of near and far display limits. Those limits can be distance values that can be used to determine whether the off-screen POI is to be displayed, and if so, how. Accessing the near and far display limits is indicated by block 202.

Distance determination logic 138 then selects one of the off-screen POIs for consideration. This is indicated by block 204. Distance determination logic 138 then determines a distance of the selected off-screen POI from a reference point on (e.g., the center of) the map display being displayed. Determining a distance corresponding to the selected off-screen POI is indicated by block 206.

Limit comparison logic 142 then compares the distance for the selected off-screen POI to the near and far display limits. This is indicated by block 208. In one example, three different types of actions can be taken based upon the comparison. For example, it may be that certain off-screen POIs should not be displayed if they are located a distance that is further than the far limit from the reference point on the map display. However, it may be that those same POIs should be displayed if they are off-screen, but closer than the near display limit. It may be that they can be displayed in a different way if they are between the near and far display limits. Thus, display element generator logic 144 determines how the distance corresponding to the selected off-screen POI compares to the near and far display limits. This is indicated by block 210 in the flow diagram of FIG. 3.

In one example, if limit comparison logic 142 determines that the selected off-screen POI is located further than the far display limit from the reference point on the map display, then display element generator logic 144 determines that the off-screen POI should not be rendered, in any way, on the map display. This is indicated by block 212.

Off-screen POI display system 134 then determines whether there are any more off-screen POIs to consider, as indicated by block 214. If so, processing reverts to block 204 where the next off-screen POI is selected for consideration.

If, on the other hand, it is determined at block 210 that the distance corresponding to the selected off-screen POI indicates that the off-screen POI is closer than the near display limit, then display element generator logic 144 generates a full off-screen POI element for the selected off-screen POI. Generating a full off-screen POI display element is indicated by block 216.

Direction determination logic 140 then determines a direction of the off-screen POI relative to the reference point on the map display being displayed, and identifies a location on the border of the map display being displayed that intersects with a direction line segment indicating the direction of the off-screen POI relative to the reference point. Map display logic 130 then renders the off-screen POI display element at the identified position on the border of the map display. Identifying the position on the border of the map display where the off-screen POI display element is to be rendered, and rendering it at that position, is indicated by blocks 218 and 220 in the flow diagram of FIG. 3.

Returning again to block 210, if limit comparison logic 142 determines that the off-screen POI is located at a distance from the reference point on the map display that is between the near and far display limits, then it may be a more accurate representation of the POI to have only part of the off-screen POI display element displayed. This may give the visual impression that the POI is sliding onto the display gradually, as the user gets closer to the POI or moves further in the direction of the POI. Thus, instead of simply having the off-screen POI display element initially displayed, in full, it may be partially displayed and then fully displayed, as the user gets closer to the off-screen POI. This gives the user a more intuitive indication of the distance of the POI relative to the reference point on the map display that is currently being displayed. Generating a partial off-screen POI display element is indicated by block 222 in the flow diagram of FIG. 3.

In one example, once display element generator logic 144 generates a partial off-screen POI display element, it continues to monitor the distance between the reference point on the map display and the off-screen POI and modifies the partial off-screen POI display element accordingly. As the distance is reduced, the proportion of the off-screen POI display element that is rendered increases. Once the distance is less than the near display limit, then the entire off-screen POI display element is displayed on the border of the map display. Continuing to monitor the distance is indicated by block 224. The partial off-screen POI display element can be generated in other ways as well, and this is indicated by block 226.

In one example, the proportion of the off-screen POI display element that is rendered (when its distance is between the near and far display elements) is a percentage value, or is rounded to a percentage value. For instance, if the off-screen POI is located 25% of the way from the far display limit to the near display limit, the partial off-screen POI display element may be generated to only show 25% of the full off-screen POI display element. When the off-screen POI is located 50% of the way between the far and near display limits, then the partial off-screen POI display element may be rendered to show 50% of the display element, and so on. Of course, this is just one example.

It will also be noted that, in one example, the display elements representing off-screen POIs are visually distinguished from the display elements representing on-screen POIs. This may be done by using different color or format for the two different kinds of display elements (those representing on-screen POIs and those representing off-screen POIs), using different shape display elements or in a variety of other ways. This may assist the user in distinguishing between display elements representing on-screen POIs and those representing off-screen POIs.

FIG. 4 shows one example of a mobile device 300 that displays one example of a user interface display 302. User interface display 302 includes a set of user input mechanisms 304 that can be actuated by user 112 in order to manipulate the map system 118. User interface display 302 also includes an on-screen map display 306. On-screen map display 306 may be a map display showing locations, roads, landmarks, etc. Display 306 also shows a set of on-screen POI display elements 308 and 310 that represent on-screen POIs.

FIG. 4 also shows, in dashed lines, a far display limit 312, and a near display limit 314. Display limits 312 and 314 may be scaled based upon the zoom level of the on-screen map display 306. They indicate distance thresholds or limits that are used by limit comparison logic 142 and display element generator logic 144 to generate either a partial or full off-screen POI display element representing off-screen POIs that are to be displayed.

FIG. 4 also shows two off-screen POI display elements that correspond to two different off-screen POIs that are located at different distances from a reference point (in this case, the center point 316) of on-screen map display 306. In the example shown in FIG. 4, off-screen POI display element 318 is a partial display element because the corresponding off-screen POI is located at a distance between the far display limit 312 and the near display limit 314. Therefore, as shown in FIG. 4, the display element representing that off-screen POI is only partial. However, the off-screen POI display element 320 is a full display element because the corresponding off-screen POI is located at a distance closer than the near display limit 314 to the reference point on the on-screen map display.

Both display elements 318 and 320 are illustratively displayed on, or approximately on, a border 322 of the on-screen map display 306. They are also illustratively displayed at a location on that border that indicates a direction in which the off-screen POI is located, relative to reference point 316. In one example, off-screen display elements 318 and 320 can be displayed in a very coarse direction (such as North, South, East or West). Therefore, for instance even if the POI corresponding to off-screen POI display element 318 is located Northeast of reference point 316, off-screen POI display element 318 may be displayed due North of reference point 316. However, the granularity with which the direction is indicated by the location of the display element on border 322 may be greater as well. For instance, direction determination logic 140 may calculate or otherwise obtain the angle from the reference point 316 to the off-screen POI being considered, and determine an intersection between a line segment on that angle and the border 322 of on-screen display 306. Thus, if the off-screen POI being considered is located slightly Northeast of reference point 316, then it will be displayed at a location where a direction line segment on that angle intersects with border 322.

Figure 4A:
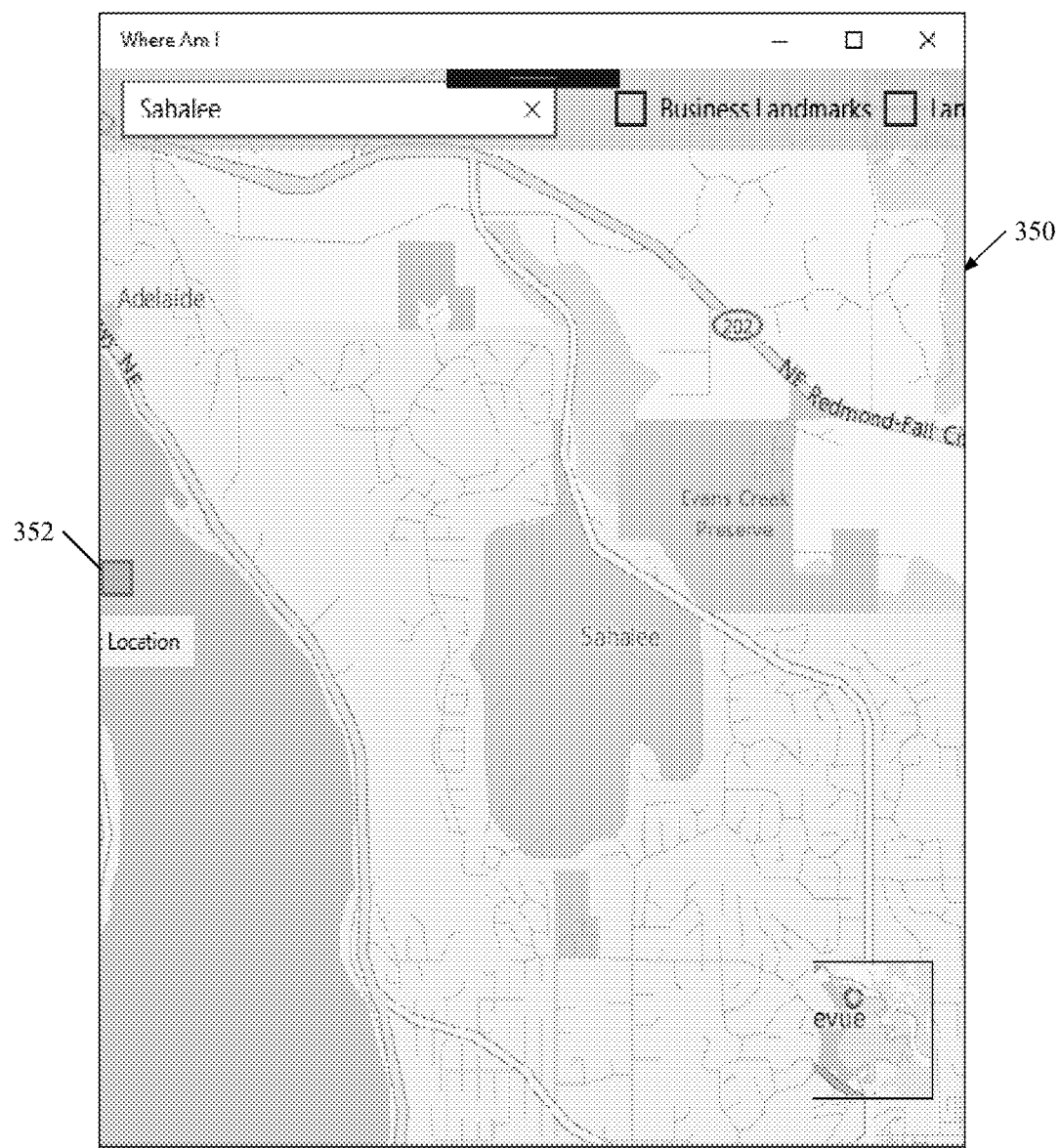
FIGS. 4A-4C show additional examples of user interface displays.
Figure 4B:
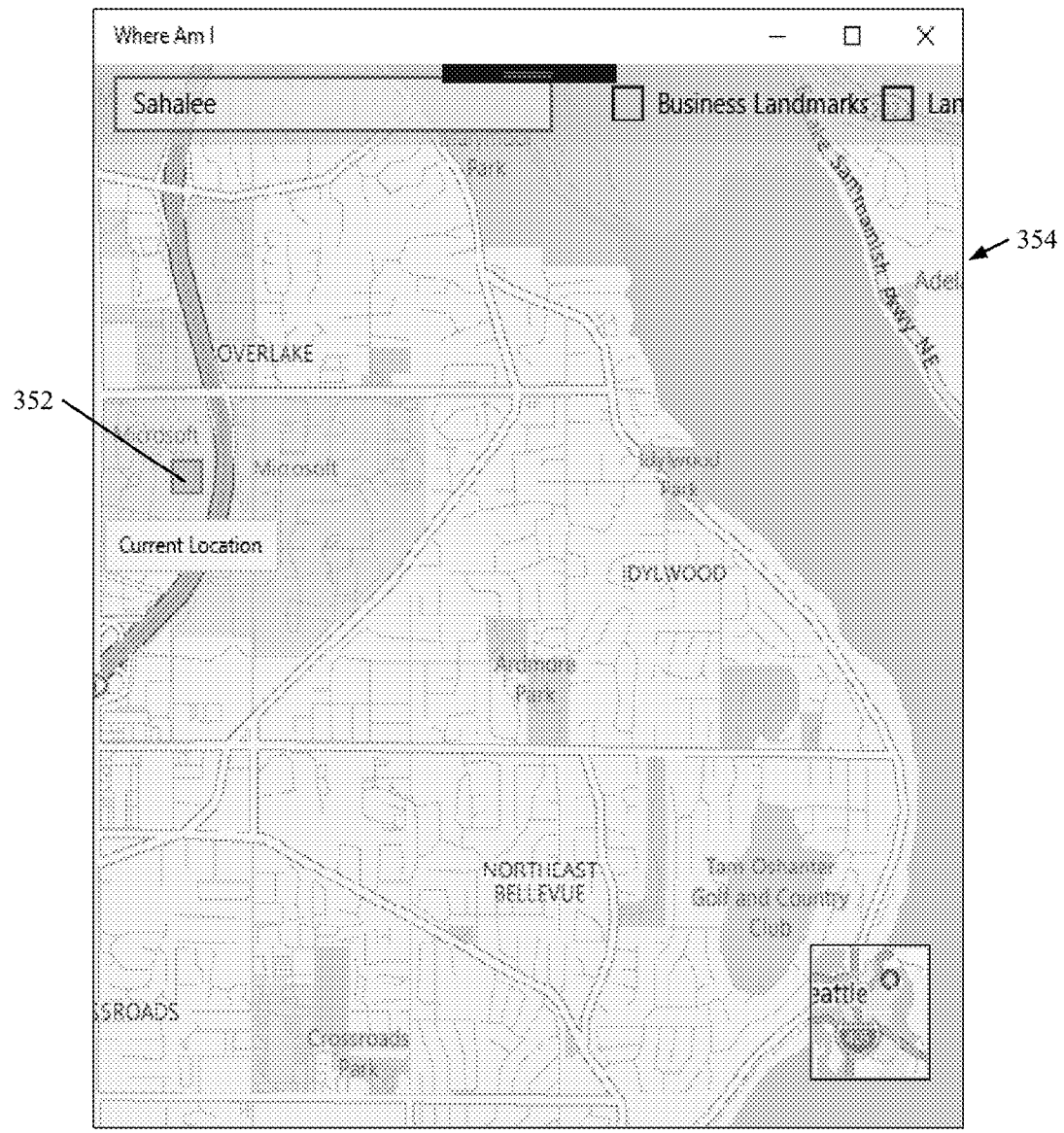
Figure 4C:
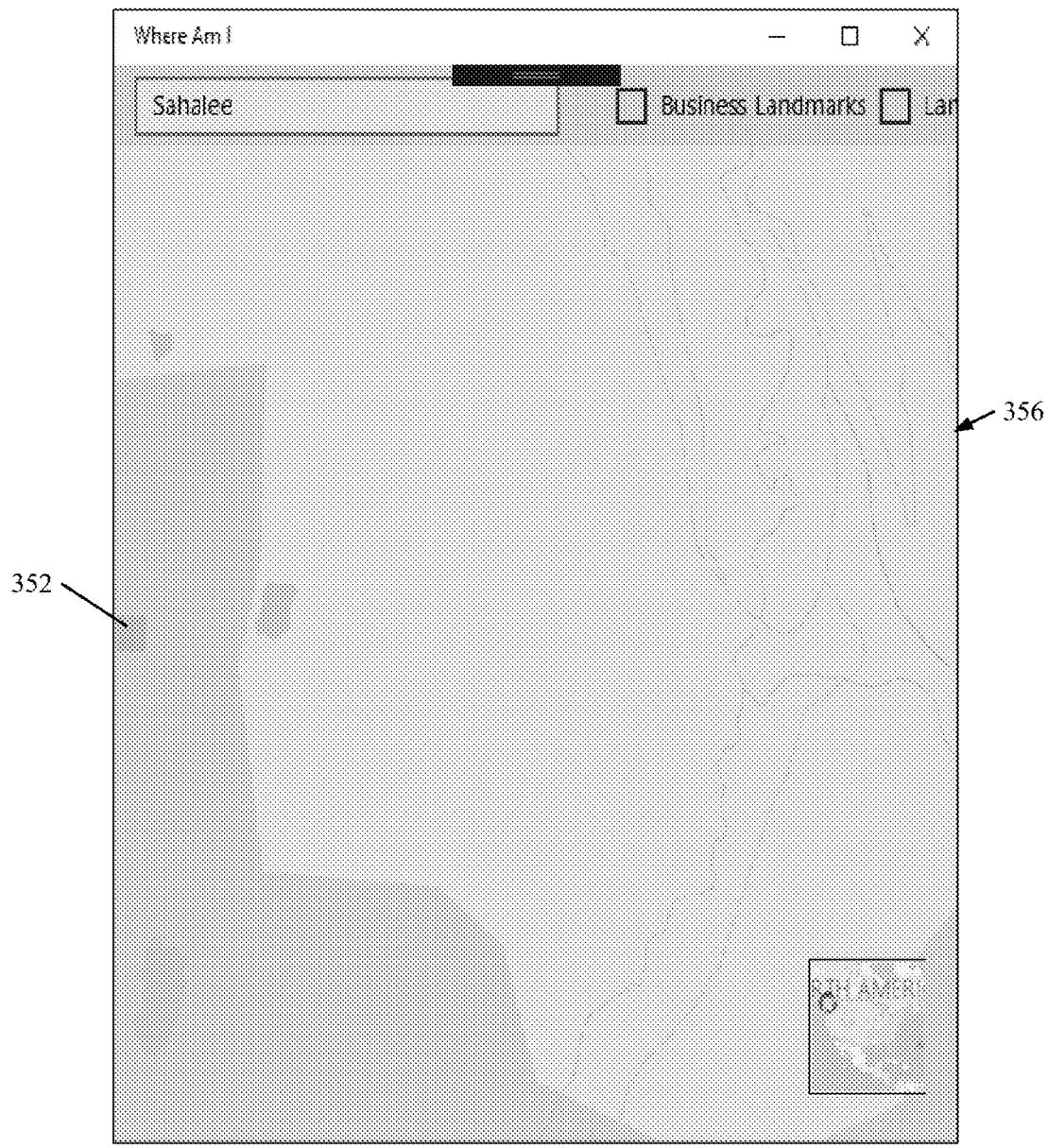

FIGS. 4A, 4B and 4C show additional examples of user interface displays. FIG. 4A shows a user interface display 350 that is generated in response to user 112 searching for "Sahalee", which is located at a center of display 350. The current location of user 112 is off-screen in a Westerly direction relative to the center of display 350 but is represented by display element 352.

FIG. 4B shows user interface display 354, which is similar to display 350, except that the view has been panned Westerly. It can be seen in FIG. 4B that the display element 352, which represents the user's current location, has now moved on-screen, onto display 354.

FIG. 4C shows user interface display 356, which is also similar to display 350, except that the view has been panned Easterly. As the user's current location moves further off-screen, display element 352 begins to fade until it disappears once it crosses the far display limit.

A number of scenarios will now be described, by way of example only. Assume, for instance, that user 112 disembarks a flight at a new city and activates map system 118 to display a map of the user's current location. Assume also that user 112 knows the address or location of where he or she is staying (e.g., the location of his or her hotel) but the map has zoomed into the user's current location to such a degree that the hotel is off-screen. For additional context, the present system renders either a partial or full off-screen POI display element corresponding to the user's hotel at the border of the map display, at a position on the border indicating the POIs direction relative to a current location of user 112. This can substantially aide in orientation and navigation.

In another scenario, assume that user 112 is on a relatively long driving trip. Assume that user 112 does not know exactly where the destination is, but has an address or other geographic location for that endpoint. Even though the road that user 112 is on may wind around significantly, a partial or full off-screen POI display element will be generated for the user's destination location and rendered in a way in which it hovers at the edge of the map display, indicating the direction of the user's ultimate destination, from the user's current location.

In yet another scenario, assume that user 112 begins a relatively short trip to see a friend. The friend sends user 112 a link to a restaurant that they are meeting at, and user 112 activates map system 118 and actuates the link. Map display logic 130 zooms into a street level around the restaurant, but user 112 does not know where that location is, relative to other known points of interest of user 112. Thus, in one example, off-screen POI system 134 generates partial or full POI display elements indicative of other, known POIs (such as the work location of user 112, the home location of user 112, etc.), and those POI display elements hover around the border of the map display showing user 112 that he or she is West of work and South of home, by way of example. This provides suggestions as to the user's location and how to navigate to the desired destination.

The present system thus greatly enhances the accuracy of the map display in showing points of interest. It provides navigation information or context, which also greatly enhances the user experience and the accuracy with which the user can use the system.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
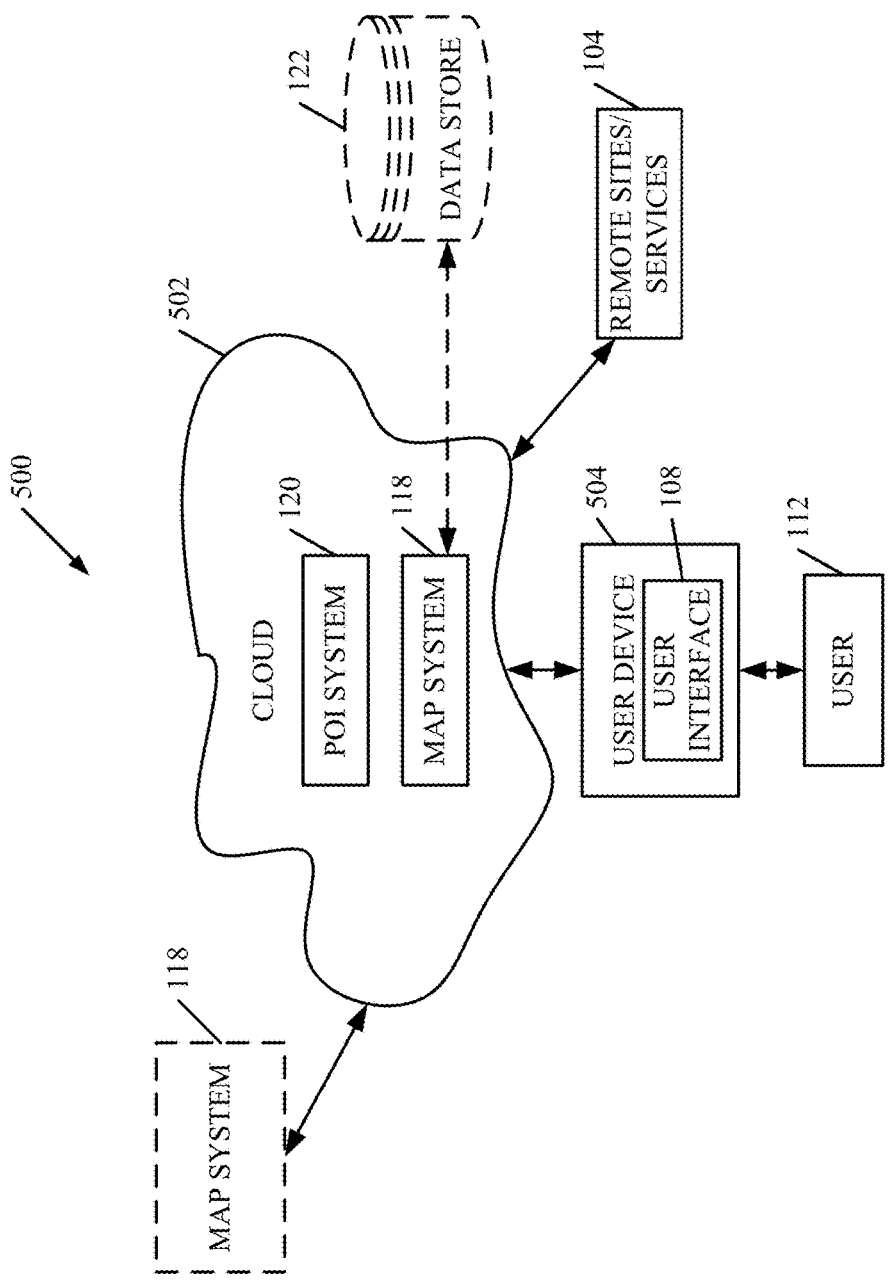
FIG. 5 is a block diagram showing the computing system architecture illustrated in FIG. 1, but deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that portions of computing system 102 can be located in cloud 502 (which can be public, private, or a combination where portions are public while others are private). Therefore, user 112 uses a user device 504 to access those systems through cloud 502. FIG. 5 shows map system 118 and POI system 120 in cloud 502, but different or other items can be in cloud 502 as well.

FIG. 5 also depicts another example of a cloud architecture. FIG. 5 shows that it is also contemplated that some elements of computing system 102 can be disposed in cloud 502 while others are not. By way of example, data store 122 can be disposed outside of cloud 502, and accessed through cloud 502. In another example, map system 118 (or other items) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
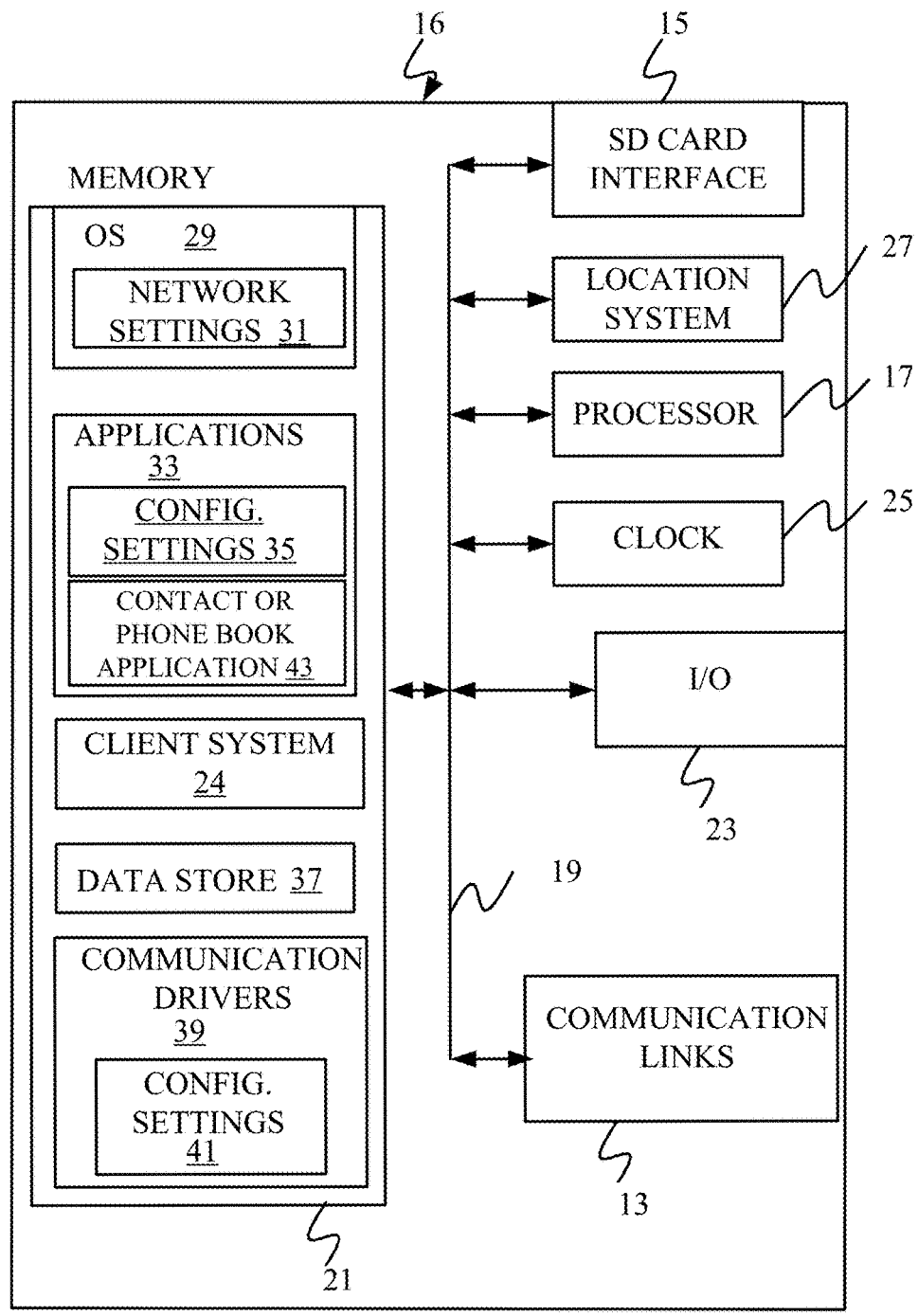
FIGS. 6-8 show examples of mobile devices that can be used in the architectures shown in the previous figures.
Figure 7:
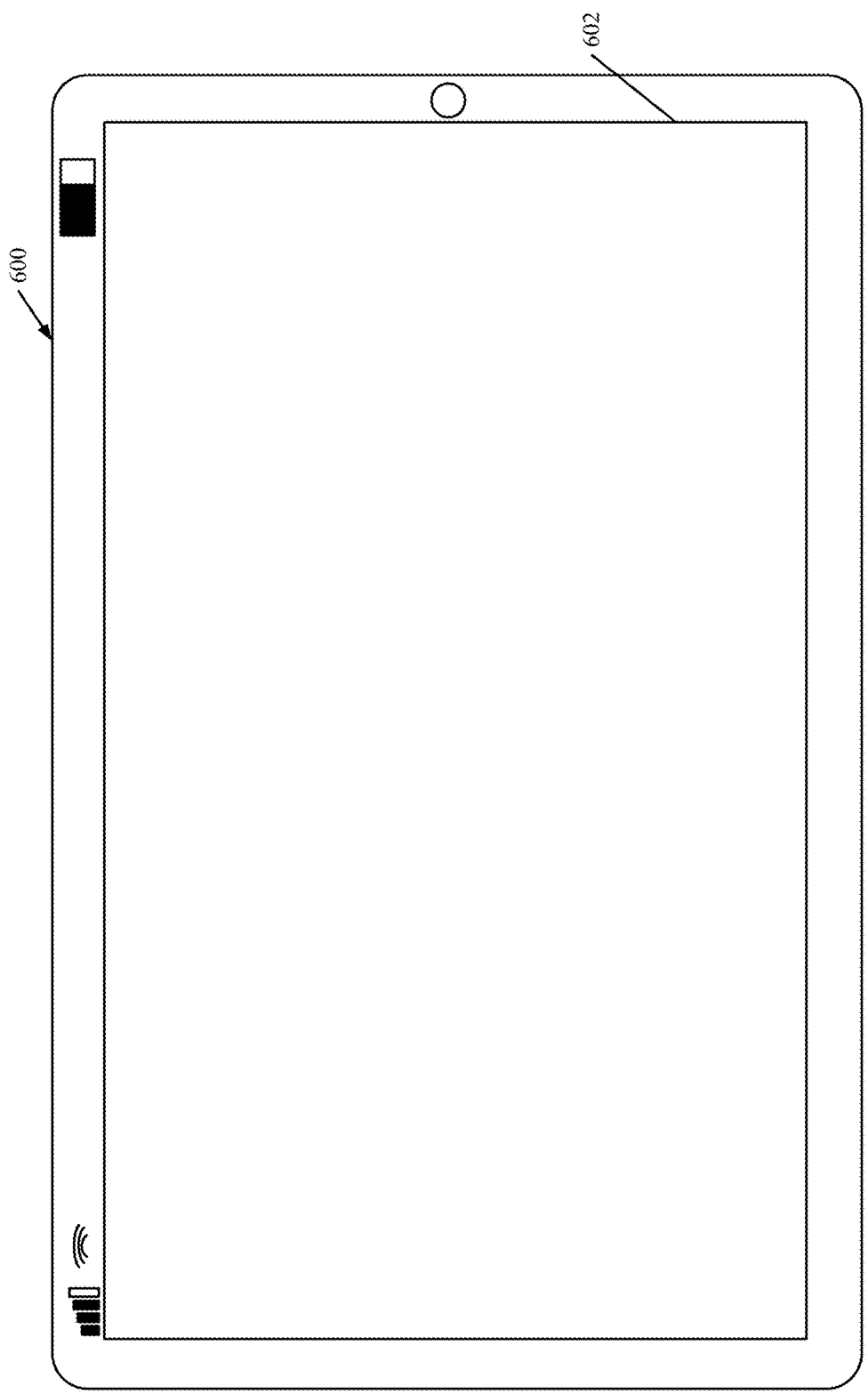
Figure 8:
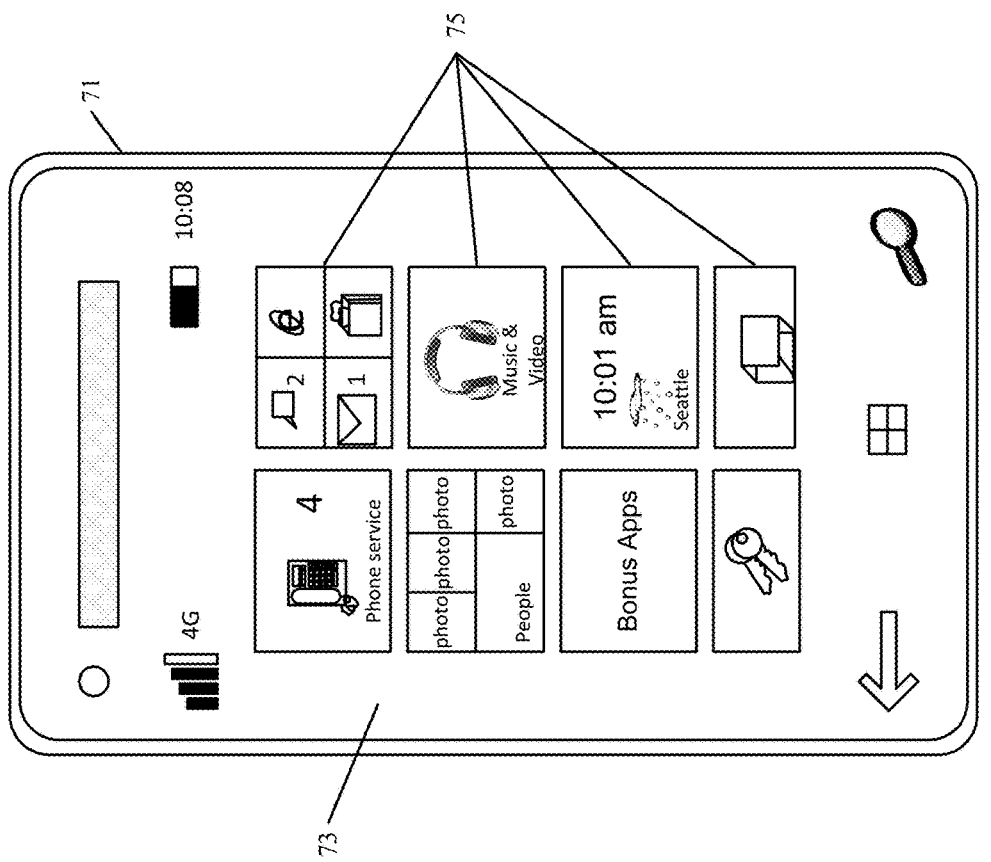

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 102 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 114 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of computing system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
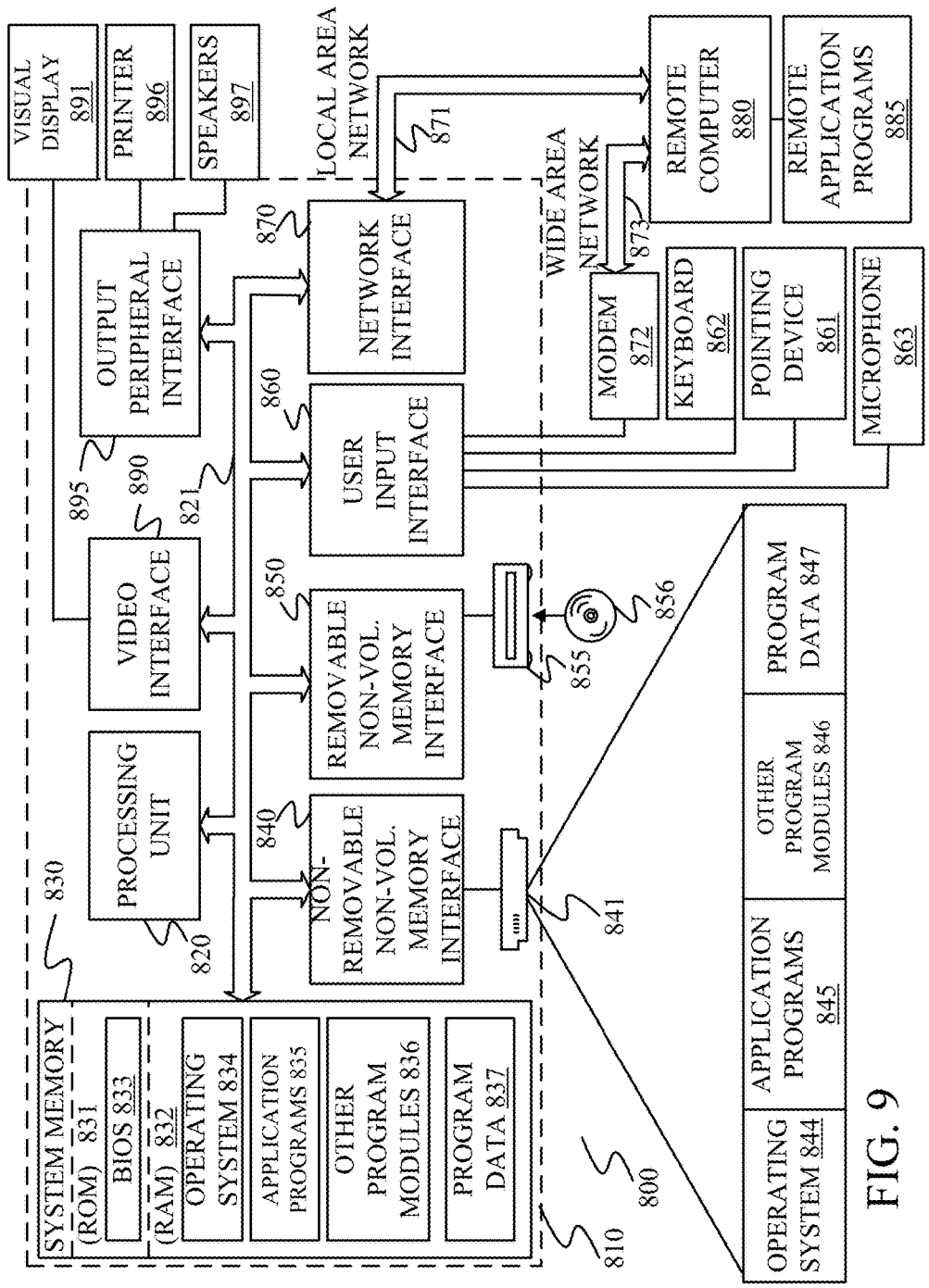
FIG. 9 is a block diagram showing one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

map display logic that generates a map display having an on-screen display portion;

a point of interest (POI) system that surfaces on-screen and off-screen points of interest (POIs) based on POI identification criteria; and an off-screen POI display system that identifies a given off-screen POI, surfaced by the POI system, to be displayed on the map display and generates a display element corresponding to the given off-screen POI, the off-screen POI display system identifying a position on the map display for displaying the display element based on a direction of the given off-screen POI relative to a reference point on the map display.

Example 2 is the computing system of any or all previous examples wherein the off-screen POI display system comprises:

distance determination logic that determines a distance of the given off-screen POI relative to the reference point on the map display, the map display logic selectively displaying the display element on the map display based on the distance and the position.

Example 3 is the computing system of any or all previous examples wherein the off-screen POI display system comprises:

direction determination logic that identifies a direction in which the given off-screen POI is located relative to the reference point on the map display and identifies the position on the map display for displaying the display element based on the direction.

Example 4 is the computing system of any or all previous examples wherein the direction determination logic identifies the position on the map display for displaying the display element based on the direction as a point on a border of the map display that intersects a direction line segment that runs from the reference point on the map display in the identified direction.

Example 5 is the computing system of any or all previous examples wherein the off-screen POI display system comprises:

limit comparison logic that compares the distance of the given off-screen POI relative to the reference point on the map display to a distance limit value, the map display logic selectively displaying the display element based on the comparison.

Example 6 is the computing system of any or all previous examples wherein the off-screen POI display system comprises:

display element generator logic that generates the display element based on the comparison.

Example 7 is the computing system of any or all previous examples wherein the limit comparison logic compares the distance of the given off-screen POI relative to the reference point on the map display to a near distance limit value and a far distance limit value, the display element generator logic generating the display element as a full display element when the distance is less than the near limit value.

Example 8 is the computing system of any or all previous examples wherein the display element generator logic is configured to generate the display element as a partial display element when the distance is between the near and far distance limit values.

Example 9 is the computing system of any or all previous examples wherein the display element generator logic is configured to generate the POI display element to increase a size of the display element as the distance moves from the far distance limit value toward the near distance limit value.

Example 10 is a computer implemented method, comprising:

identifying an on-screen and an off-screen point of interest (POI) based on POI identification criteria;

generating a map display having an on-screen display portion showing a first display element corresponding to the on-screen POI;

generating a second display element corresponding to the off-screen POI;

identifying a position on the map display for displaying the second display element based on a direction of the given off-screen POI relative to a reference point on the map display; and displaying the second display element at the identified position on the map display.

Example 11 is the computer implemented method of any or all previous examples wherein displaying the second display element comprises:

determining a distance of the given off-screen POI relative to the reference point on the map display; and selectively displaying the second display element on the map display based on the distance and the identified position.

Example 12 is the computer implemented method of any or all previous examples wherein identifying a position comprises:

identifying a direction in which the given off-screen POI is located relative to the reference point on the map display; and identifying the position on the map display for displaying the second display element based on the direction.

Example 13 is the computer implemented method of any or all previous examples identifying the position based on the direction comprises:

identifying a point on a border of the map display that intersects a direction line segment that runs from the reference point on the map display in the identified direction.

Example 14 is the computer implemented method of any or all previous examples wherein displaying the second display element comprises:

comparing the distance of the given off-screen POI relative to the reference point on the map display to a distance limit value; and selectively displaying the second display element based on the comparison.

Example 15 is the computer implemented method of any or all previous examples wherein generating the second display element comprises:

generating the second display element based on the comparison.

Example 16 is the computer implemented method of any or all previous examples wherein comparing comprises:

comparing the distance of the given off-screen POI relative to the reference point on the map display to a near distance limit value and to a far distance limit value, wherein generating the second display element comprises generating the second display element as a full display element when the distance is less than the near limit value.

Example 17 is the computer implemented method of any or all previous examples wherein generating the second display element comprises generating the second display element as a partial display element when the distance is between the near and far distance limit values.

Example 18 is the computer implemented method of any or all previous examples wherein generating the second display element comprises generating the second display element to increase a size of the second display element as the distance moves from the far distance limit value toward the near distance limit value.

Example 19 is a computing system, comprising:
map display logic that generates a map display having an on-screen display portion;
a point of interest (POI) system that surfaces on-screen and off-screen points of interest (POIs) based on POI identification criteria;
an off-screen POI display system that identifies a given off-screen POI, surfaced by the POI system, to be displayed on the map display and generates a display element corresponding to the given off-screen POI;
distance determination logic that determines a distance of a given POI relative to a reference point on the map display; and
direction determination logic that identifies a direction in which the given off-screen POI is located relative to the reference point on the map display and identifies a position on the map display for displaying the display element based on the direction, the map display logic selectively displaying the display element on the map display based on the distance and the position.

Example 20 is the computing system of any or all previous examples wherein the off-screen POI display system comprises:
display element generator logic that generates the display element; and
limit comparison logic configured to compare the distance of the given off-screen POI relative to the reference point on the map display to a near distance limit value and to a far distance limit value, the display element generator logic generating the display element as a full display element when the distance is less than the near limit value, the display element generator logic being configured to generate the display element as a partial display element when the distance is between the near and far distance limit values, and the display element generator logic being configured to generate the display element to increase a size of the display element as the distance moves from the far distance limit value toward the near distance limit value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
a processor: and
memory storing instructions executable by the processor, wherein the instructions, when executed, configure the computing system to provide:
a map display component configured to generate a map display having an on-screen display portion;
a point of interest (POI) system configured to surface on-screen and off-screen points of interest (POIs) based on POI identification criteria;
an off-screen POI display system configured to:
identify a given off-screen POI, surfaced by the POI system, to be displayed on the map display;
determine a distance of the given off-screen POI relative to a reference point on the map display;
compare the determined distance of the given off-screen POI relative to the reference point on the map display to a near distance limit value and a far distance limit value;
based on the comparison, generate a display element corresponding to the given off-screen POI, wherein the display element is generated as a full display element when the distance is less than the near distance limit value; and
identify a position on the map display based on a direction of the given off-screen POI relative to the reference point on the map display;
wherein the map display component is configured to display the display element on the map display based on the identified position.

2. The computing system of claim 1 wherein the off-screen POI display system is configured to identify the position on the map display for displaying the display element based on the direction as a point on a border of the map display that intersects a direction line segment that runs from the reference point on the map display in the identified direction.

3. The computing system of claim 1 wherein the off-screen POI display system is configured to generate the display element as a partial display element when the distance is between the near and far distance limit values.

4. The computing system of claim 3 wherein the off-screen POI display system is configured to generate the POI display element to increase a size of the display element as the distance moves from the far distance limit value toward the near distance limit value.

5. A computer implemented method, comprising:
identifying an on-screen point of interest (POI) and an off-screen POI based on POI identification criteria;
generating a map display having an on-screen display portion showing a first display element corresponding to the on-screen POI;
determining a distance of the off-screen POI relative to a reference point on the map display:
comparing the distance to a near distance limit value and a far distance limit value;
based on a determination that the distance is between the near and far distance limit values, generating a second display element, corresponding to the off-screen POI, as a partial display element;
identifying a position on the map display for displaying the second display element based on a direction of the off-screen POI relative to the reference point on the map display;
displaying the second display element at the identified position on the map display; and
increasing a size of the second display element as the distance moves from the far distance limit value toward the near distance limit value.

6. The computer implemented method of claim 5 wherein identifying the position based on the direction comprises:
identifying a point on a border of the map display that intersects a direction line segment that runs from the reference point on the map display in the identified direction.

7. The computer implemented method of claim 5, wherein generating the second display element comprises generating the second display element as a full display element when the distance is less than the near distance limit value.

8. A computing system, comprising:
a processor; and memory storing instructions executable by the processor, wherein the instructions, when executed, configure the computing system to:
- identify an on-screen point of interest (POI) and an off-screen POI based on POI identification criteria;
- generate a map display having an on-screen display portion showing a first display element corresponding to the on-screen POI;
- determine a distance of the off-screen POI relative to a reference point on the map display
- compare the distance to a near distance limit value and a far distance limit value;
- based on a determination that the distance is between the near and far distance limit values,
  - generate a second display element, corresponding to the off-screen POI, as a partial display element;
- identify a position on the map display for displaying the second display element based on a direction of the off-screen POI relative to the reference point on the map display; and
- increase a size of the second display element as the distance moves from the far distance limit value toward the near distance limit value.

9. The computing system of claim 8 wherein the second display element is generated as a full display element when the distance is less than the near distance limit value.

\* \* \* \* \*